(12) United States Patent
Mays et al.

(10) Patent No.: US 8,468,246 B2
(45) Date of Patent: *Jun. 18, 2013

(54) SYSTEM AND METHOD FOR ALLOCATING RESOURCES IN A DISTRIBUTED COMPUTING SYSTEM

(75) Inventors: James J. Mays, McKinney, TX (US); Michael L. Williams, Rockwall, TX (US); Michael L. Forsman, Sachse, TX (US)

(73) Assignee: Raytheon Company, Waltham, MA (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/422,653

(22) Filed: Apr. 13, 2009

(65) Prior Publication Data

US 2010/0262695 A1 Oct. 14, 2010

(51) Int. Cl.
*G06F 15/16* (2006.01)
*G06F 15/173* (2006.01)

(52) U.S. Cl.
USPC ............................ 709/226; 709/225; 709/229

(58) Field of Classification Search
USPC ......................................... 709/200, 223–229
See application file for complete search history.

(56) References Cited

U.S. PATENT DOCUMENTS

| | | | |
|---|---|---|---|
| 7,171,470 B2 | 1/2007 | Doyle et al. | 709/225 |
| 7,299,229 B2 | 11/2007 | Doyle et al. | 707/8 |
| 7,310,684 B2 | 12/2007 | Patrick et al. | 709/238 |
| 2004/0162901 A1* | 8/2004 | Mangipudi et al. | 709/225 |
| 2005/0021530 A1* | 1/2005 | Garg et al. | 707/100 |
| 2006/0129687 A1* | 6/2006 | Goldszmidt et al. | 709/229 |
| 2008/0080396 A1* | 4/2008 | Meijer et al. | 370/254 |
| 2009/0187658 A1* | 7/2009 | Williams et al. | 709/226 |
| 2010/0058347 A1* | 3/2010 | Smith et al. | 718/104 |

OTHER PUBLICATIONS

Williams et al.; U.S. Appl. No. 12/018,021, "System for Allocating resources in a Distributed Computing System," filed Jan. 22, 2008, 28 pages.
Williams et al.; U.S. Appl. No. 12/018,005, "Service Level Agreement Based Control of a Distributed Computing System," filed Jan. 22, 2008, 27 pages.

* cited by examiner

*Primary Examiner* — Shirley Zhang
(74) *Attorney, Agent, or Firm* — Cantor Colburn LLP (57) ABSTRACT

According to a particular embodiment of the present invention, a system and method for allocating resources in a distributed computing system are provided. In one embodiment, a distributed computing system includes a computing grid including a plurality of grid nodes, a web server configured in a service-oriented architecture and operable to provide one or more business applications to a plurality of clients by executing one or more services on the plurality of grid nodes, and a resource control system communicatively coupled to the web server. The resource control system is operable to receive one or more performance parameters of the business applications executed on the plurality of grid nodes, provision one or more of the grid nodes in response to the performance parameters falling below a predetermined minimum level, and un-provision one or more of the grid nodes in response to the performance parameters exceeding a predetermined maximum level. The plurality of clients comprises a plurality of client subsets, each client subset requiring a respective quality of service, and each of the grid nodes in the computing grid is assigned a particular client subset for which to execute services.

20 Claims, 7 Drawing Sheets

SYSTEM AND METHOD FOR ALLOCATING RESOURCES IN A DISTRIBUTED COMPUTING SYSTEM

TECHNICAL FIELD OF THE INVENTION

This disclosure generally relates to distributed computing systems and, more particularly, to a system and method for allocating resources in a distributed computing system.

BACKGROUND OF THE INVENTION

Distributed computing systems are computer systems in which computer processes are split into parts that are run on multiple computers communicating over a network, such as the Internet. These systems may offer the advantage of being able to use low-cost, scalable hardware components to provide computational power similar to other, more expensive, systems and may provide relatively efficient use of computing resources by distributing the processing load of one or more users across multiple computers.

One type of architecture that may be used by distributed computing systems is a service-oriented architecture (SOA). Service-oriented architectures separate various functions into discrete units, or services, that may be combined and reused to produce different business applications. Distributed computing systems that provide web services using a service-oriented architecture may provide relatively efficient operation. However, such systems may not efficiently handle transient and/or periodic resource demands that may be encountered. Such systems may also not be able to guarantee a service level to a user of the web services.

SUMMARY OF THE INVENTION

In accordance with the teachings of particular embodiments of the present invention, a system and method for allocating resources in a distributed computing system are provided.

In a particular embodiment of the present invention, a distributed computing system comprises a computing grid including a plurality of grid nodes, a web server configured in a service-oriented architecture, and a resource control system communicatively coupled to the web server. The web server is operable to provide one or more business applications to a plurality of clients by executing one or more services on the plurality of grid nodes, wherein the plurality of clients comprises a plurality of client subsets, each client subset requiring a respective quality of service, and each of the grid nodes in the computing grid is assigned a particular client subset for which to execute services. The resource control system is operable to receive one or more performance parameters of the business applications executed on the plurality of grid nodes, provision one or more of the grid nodes in response to the performance parameters falling below a predetermined minimum level, and un-provision one or more of the grid nodes in response to the performance parameters exceeding a predetermined maximum level.

In another embodiment of the present invention, a distributed computing system comprises a web server configured in a service-oriented architecture and a resource control system communicatively coupled to the web server. The web server is operable to provide one or more business applications to a plurality of clients by executing one or more services on a plurality of computing grid nodes, wherein the plurality of clients comprise a plurality of client subsets, each client subset requiring a respective quality of service, and each of the grid nodes in the computing grid is assigned a particular client subset for which to execute services. The resource control system is operable to receive one or more performance parameters of the business applications executed on the plurality of grid nodes and provision or un-provision one or more of the grid nodes in response to the performance parameters exceeding or falling below predetermined limits.

In yet another embodiment of the present invention, a method for allocating resources in a distributed computing system comprises determining one or more performance parameters of one or more business applications provided by a web server configured in a service-oriented architecture, the web server operable to provide the one or more business applications to a plurality of clients by executing one or more services on a plurality of grid nodes configured in a computing grid; determining whether the one or more performance parameters fall below a predetermined minimum level or exceed a predetermined maximum level; and provisioning one or more of the grid nodes if the performance parameters falls below the predetermined minimum level; or un-provisioning one or more of the grid nodes if the performance parameters exceeds the predetermined maximum level; wherein the plurality of clients comprise a plurality of client subsets, each client subset requiring a respective quality of service; wherein each of the grid nodes in the computing grid is assigned a particular client subset for which to execute services; and wherein provisioning or un-provisioning the one or more grid nodes depends, at least in part, on the particular client subset assigned to the one or more grid nodes.

Particular embodiments of the disclosure may provide numerous technical advantages. For example, one embodiment of the resource control system may allow for the provisioning and un-provisioning of computing resources in a distributed computing system while allowing for different quality of service levels for the various clients. This may reduce idle time of grid nodes configured in the computing grid and result in a reduction in computer power consumption and cooling requirements. Some embodiments of the present invention may also enhance the reliability a distributed computing system by reducing operating time of the grid nodes.

While numerous potential advantages have been identified, some embodiments of the present invention may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF THE INVENTION

In accordance with the teachings of particular embodiments of the present invention, a system and method for allocating resources in distributed computing system are provided.

In a particular embodiment of the present invention, a distributed computing system comprises a computing grid including a plurality of grid nodes, a web server configured in a service-oriented architecture, and a resource control system communicatively coupled to the web server. The web server is operable to provide one or more business applications to a plurality of clients by executing one or more services on the plurality of grid nodes, wherein the plurality of clients comprises a plurality of client subsets, each client subset requiring a respective quality of service, and each of the grid nodes in the computing grid is assigned a particular client subset for which to execute services. The resource control system is operable to receive one or more performance parameters of the business applications executed on the plurality of grid nodes, provision one or more of the grid nodes in response to the performance parameters falling below a predetermined minimum level, and un-provision one or more of the grid nodes in response to the performance parameters exceeding a predetermined maximum level.

Accordingly, particular embodiments of the present invention may allow for the provisioning and un-provisioning of computing resources in a distributed computing system while allowing for different quality of service levels for the various clients. This may reduce idle time of grid nodes configured in the computing grid and result in a reduction in computer power consumption and cooling requirements, without adversely affecting the service levels guaranteed to the clients in their service level agreements. Some embodiments of the present invention may also enhance the reliability a distributed computing system by reducing operating time of the grid nodes.

Figure 1:
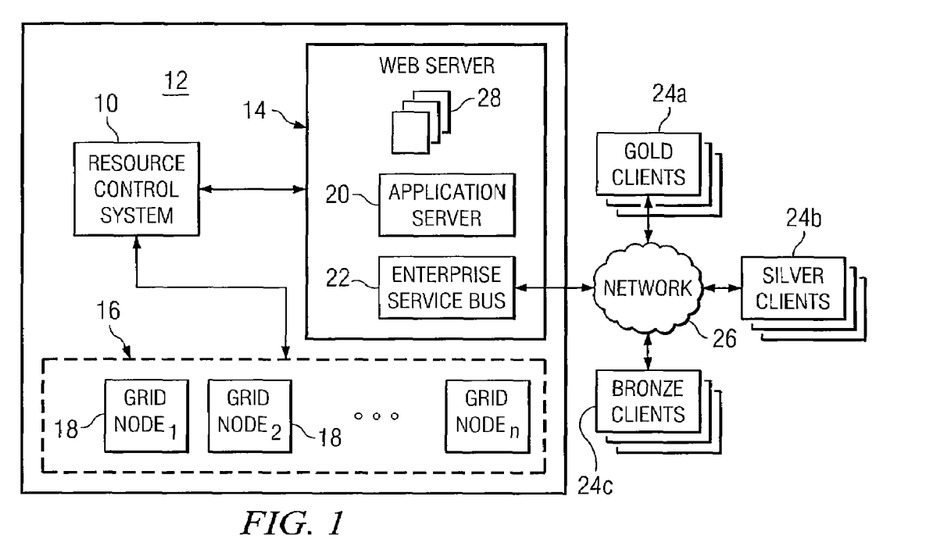
FIG. 1 is a block diagram showing a distributed computing system incorporating a resource control system according to a particular embodiment of the present invention.

FIG. 1 illustrates distributed computing system 12 in accordance with a particular embodiment of the present invention. As shown in FIG. 1, distributed computing system 12 provides business applications to one or more clients 24 through a network 26. To accomplish this, distributed computing system 12 includes a web server 14, a resource control system 10, and a computing grid 16, comprising one or more grid nodes 18. Web server 14, which includes an application server 20 and an enterprise service bus 22, provides the business applications to clients 24 using one or more services 28. These services 28 may be executed on one or more of the grid nodes 18 in computing grid 16. Resource control system 10 monitors one or more performance parameters of the business applications provided by the distributed computing system 12 and provisions and/or un-provisions resources, such as services 28 and grid nodes 18, to maintain the performance parameters at a desired level.

Generally, web server 14 incorporates a service-oriented architecture (SOA) using an enterprise service bus 22 and application server 20. Application server 20 of web server 14 provides a common interface from which clients 24 may execute selected business applications, while enterprise service bus 22 orchestrates multiple services 28 together to provide one or more business applications for clients 24. In particular embodiments, any suitable type of enterprise service bus 22 may be used. An example of one suitable enterprise service bus is Aqualogic Service Bus™, available from BEA Systems, Inc. of San Jose, Calif. Service bus 22 may be configured to monitor various performance parameters of business applications provided to client 24. The service bus 22 may also be configured to transmit a simple network management protocol (SNMP) trap event if the performance parameter exceeds an upper or a lower threshold value.

In particular embodiments, business applications may be provided to clients 24 with an agreed upon level of performance, quality of service (QoS), or priority level. In some cases, performance parameters of various business applications may be provided under a contractual agreement that may be referred to as a service level agreement (SLA). The service level agreement may include various performance parameters, such as response latency time, average data throughput, minimum data throughput, and the like. In particular embodiments, clients 24 may include different types, or tiers, of clients based upon their contracted QoS level. For example, as shown in FIG. 1, clients 24 may comprise gold clients 24a, silver clients 24b, and bronze clients 24c, where the different client types correspond to different contracted QoS levels. For example, gold clients 24a may have contracted for faster guaranteed response times; silver clients 24b may have contracted for standard guaranteed response times; and bronze clients 24c may have contracted for slower guaranteed response times. Although FIG. 1 only illustrates only three tiers of clients 24, particular embodiments of the present invention may be used to serve any number of client tiers.

To provide clients 24 with these agreed upon levels of performance, resource control system 10 dynamically provisions and/or un-provisions grid nodes 18 and services 28 of distributed computing system 12 according to one or more performance parameters of the business applications and/or QoS level agreed to as part of a SLA. In this manner, underutilized resources, such as grid nodes 18 of a computing grid 16 may be turned off to reduce electrical power and/or alleviate cooling requirements for computing grid 16 in some embodiments. Turning off power to an underutilized grid node 18 may also lengthen its operational life in which the overall availability of the computing grid 16 may be enhanced. Similarly, resource control system 10 may provision and/or un-provision services 28 in response to resource demand affecting one or more performance parameters of a service level agreement. For example, a particular business application provides access to data from a remotely coupled database (not specifically shown). To provide the business application, web server 14 may execute a service 28 that operates as a fetch engine to obtain the requested data from the remotely coupled database using appropriate handshaking signals. Resource control system 10 monitors one or more performance parameters of the business application and may provision another instance of the fetch engine service 28 in response to increased resource demand.

Resource control system 10 may provision and/or un-provision grid nodes 18 and/or services 28 in distributed computing system 10 using any suitable scheme. In one embodiment, resource control system 10 provisions or un-provisions grid nodes 18 and/or services 28 instantaneously in response to an increase or decrease, respectively, in resource demand. In another embodiment, grid nodes 18 and/or services 28 are provisioned or un-provisioned based upon a periodic schedule. For example, resource control system 10 may determine that seven grid nodes 18 operating during working hours, and three grid nodes 18 operating after working hours sufficiently maintain business applications provided by web server 14 within performance parameters of a service level agreement. In this example, resource control system 10 may generate this configuration based upon monitored performance parameters over several working days and alternatively provision and un-provision four grid nodes 18 to correspond with the working day.

In another embodiment, resource control system 10 may use a heuristic approach for provisioning and/or un-provisioning grid nodes 18 and/or services 28. That is, resource control system 10 may provision and/or un-provision resources based upon a heuristically assessed resource demand. For example, resource control system 10 may assess that a particular service 28 is to be provisioned based upon a combination of monitored performance parameters and their monitored values relative to one another.

As mentioned above, in particular embodiments of the present invention, resource control system 10 may be used to allocate computing resources to a plurality of clients 24 based, at least in part, on a QoS guaranteed to the client. As discussed above, the various clients 24 may have contracted for different QoS levels. For example, gold client 24a may be a customer that has contracted to faster guaranteed response times; silver client 24b may be a customer that has contracted for standard guaranteed response times; and bronze client 24c may be a customer that has contracted for slower guaranteed response times. In particular embodiments, resource control system 10 may allow for distributed computing system 12 to provide different computing resources to clients 24 based, at least in part, upon these guaranteed QoS levels. For example, particular grid nodes 18 may be dedicated to servicing requests from one or more particular types of clients 24 (e.g., only gold clients 24a or silver clients 24b), while other grid nodes may be allowed to service requests from any client 24.

Figure 2A:
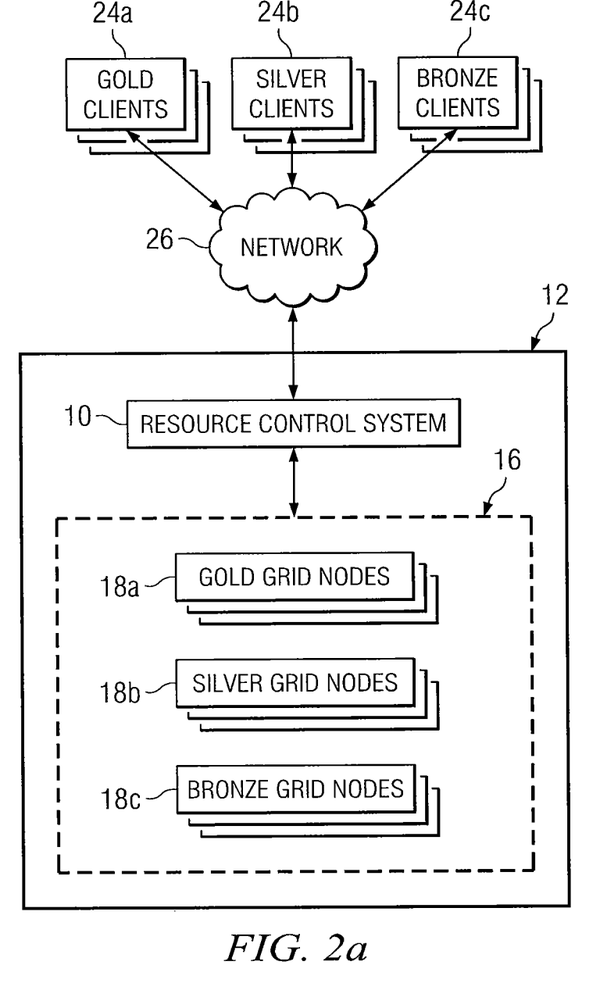
FIG. 2a is a block diagram showing a distributed computing system incorporating a resource control system to provide dedicated computing resources according to a particular embodiment of the present invention.

FIG. 2A illustrates one such distributed computing system 12 in which resource control system 10 allocates a plurality of grid nodes 18 to clients 24 based, at least in part, upon their respective guaranteed QoS levels. In this embodiment, distributed computing system 12 includes three different types of grid nodes: gold grid nodes 18a, silver grid nodes 18b, and bronze grid nodes 18c. Gold grid nodes 18a may be dedicated to handing requests from gold clients 24a, silver grid nodes 18b may be dedicated to handling requests from silver clients 24b, and bronze grid nodes 18c may be dedicated to handling requests from bronze clients 24c. This embodiment may be referred to as a "dedicated resource" scenario.

When a request comes in from a gold client 24a, resource control system 10 allocates the request to the least busy gold grid node 18a. When a request comes in from a silver client 24b, resource control system 10 allocates the request to the least busy silver grid node 18b. Lastly, when a request comes in from a bronze client 24c, resource control system 10 allocates the request to the least busy bronze grid node 18c.

Figure 2B:
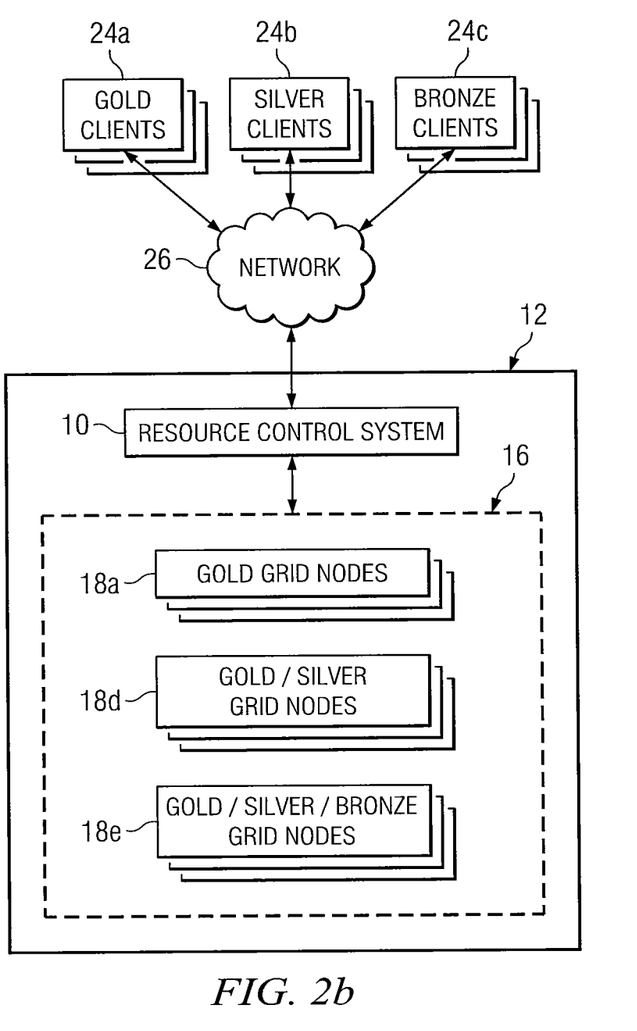
FIG. 2b is a block diagram showing a distributed computing system incorporating a resource control system to provide shared computing resources according to a particular embodiment of the present invention.

In another embodiment, shown in FIG. 2B, distributed computing system 12 may include gold grid nodes 18a, gold/silver grid nodes 18d, and gold/silver/bronze grid nodes 18e, wherein gold grid nodes 18a are dedicated to handling requests from gold clients 24a, gold/silver grid nodes 18d are dedicated to handling requests from gold clients 24a and silver clients 24b, and gold/silver/bronze grid nodes 18e are dedicated to handing requests from any of the clients 24. This embodiment may be referred to as a "shared resources" scenario.

When a request comes in from a gold client 24a, resource control system 10 allocates the request to the least busy grid node 18 dedicated to handling requests from gold clients 24a (i.e., gold grid nodes 18a, gold/silver grid nodes 18d, and gold/silver/bronze grid nodes 18e). When a request comes in from a silver client 24b, resource control system 10 allocates the request to the least busy grid node 18 dedicated to handling requests from silver clients 24b (i.e., gold/silver grid nodes 18d and gold/silver/bronze grid nodes 18e). Lastly, when a request comes in from a bronze client 24c, resource control system 10 allocates the request to the least busy grid node 18 dedicated to handling requests from bronze clients 24c (i.e., gold/silver/bronze grid nodes 18e).

Figure 2C:
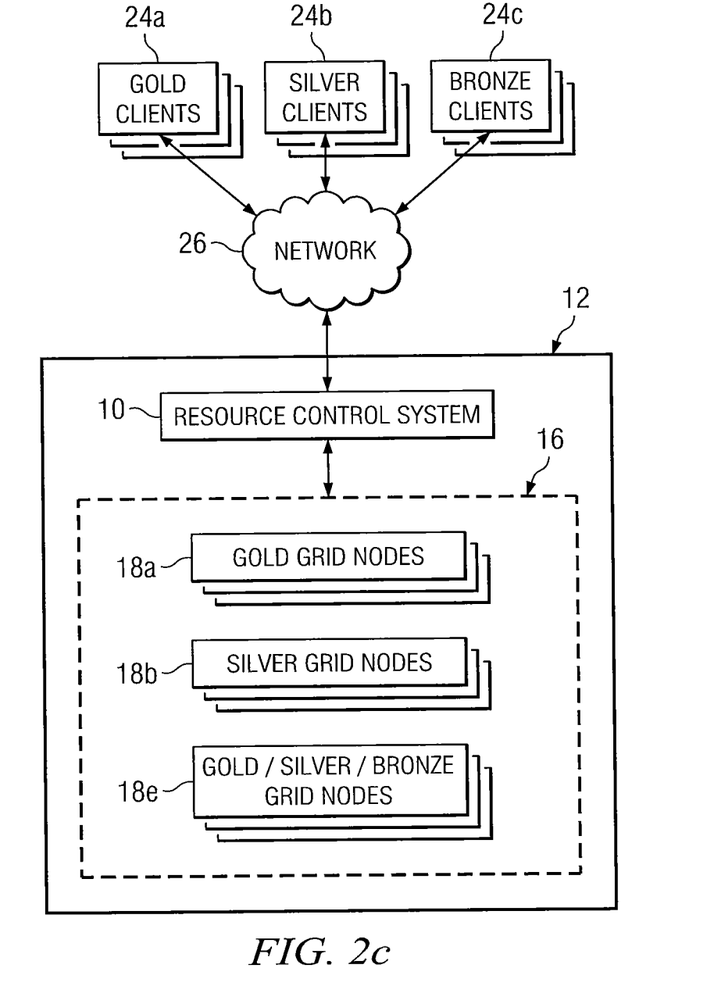
FIG. 2c is a block diagram showing a distributed computing system incorporating a resource control system to provide a combination of dedicated and shared computing resources according to a particular embodiment of the present invention to provide.

In yet another embodiment, shown in FIG. 2C, distributed computing system 12 may include gold grid nodes 18a, silver grid nodes 18b, and gold/silver/bronze grid nodes 18e, wherein gold grid nodes 18a are dedicated to handling requests from gold clients 24a, silver grid nodes 18b are dedicated to handling requests from silver clients 24b, and gold/silver/bronze grid nodes 18e are dedicated to handing requests from any of the clients 24. This embodiment may be referred to as a "combined resources" scenario.

When a request comes in from a gold client 24a, resource control system 10 allocates the request to the least busy grid node 18 dedicated to handling requests from gold clients 24a (i.e., gold grid nodes 18a and gold/silver/bronze grid nodes 18e). When a request comes in from a silver client 24b, resource control system 10 allocates the request to the least busy grid node 18 dedicated to handling requests from silver clients 24b (i.e., silver grid nodes 18b and gold/silver/bronze grid nodes 18e). Lastly, when a request comes in from a bronze client 24c, resource control system 10 allocates the request to the least busy grid node 18 dedicated to handling requests from bronze clients 24c (i.e., gold/silver/bronze grid nodes 18e).

If the grid nodes 18 dedicated to a particular type of client 24 become too overloaded, resource control system 10 may provision additional grid nodes 18 to service those clients 24. Conversely, if the grid nodes 18 dedicated to a particular type of client 24 are underutilized, resource control system 10 may un-provision a portion of those grid nodes 18 and reallocate the tasks those grid nodes 18 were performing to other grid nodes 18 of that type. For example, if gold grid nodes 18a become overloaded, resource control system 10 may provision additional gold grid nodes 18a to service requests from gold clients 24a. If the number of gold grid nodes 18a in service outpaces demand, resource control system 10 may un-provision a portion of those gold grid nodes 18a, distributing the load to the remaining gold grid nodes 18a.

Figure 3:
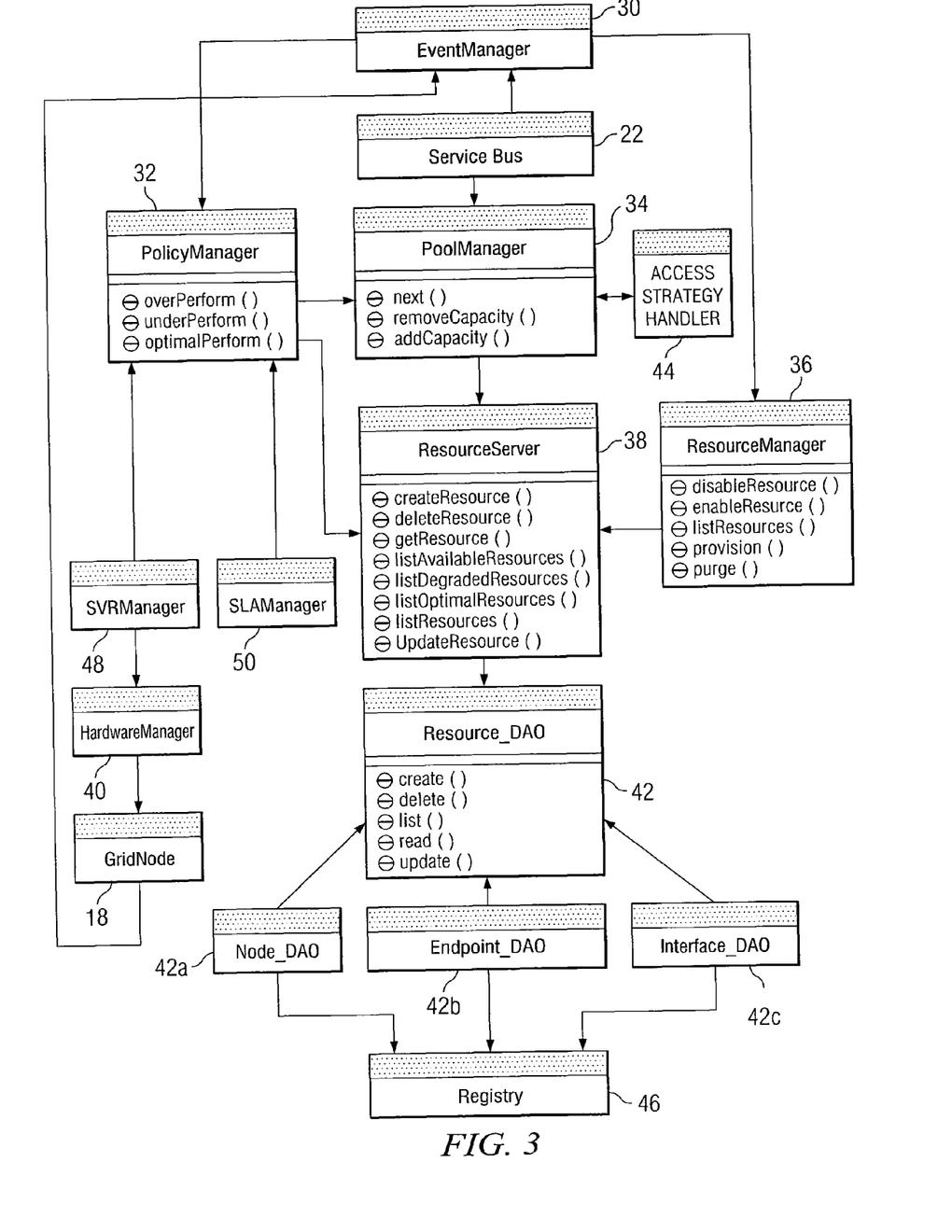
FIG. 3 is a block diagram showing several components of the resource control system of FIGS. 1 and 2a-c.

FIG. 3 shows several components of a resource control system 10 in accordance with a particular embodiment of the present invention. As shown in FIG. 3, resource control system 10 includes an event manager 30, a policy manager 32, a pool manager 34, a resource manager 36, a resource server 38, a hardware manager 40, a resource data access object 42, an access strategy handler 44, and a service registry 46 coupled as shown. Policy manager 32 includes a server manager 48 for handling provisioning and un-provisioning of grid nodes 18 and a service level agreement manager 50 for handling provisioning and un-provisioning of services 28. Resource data access object 42 includes a node data access object 42a, an endpoint data access object 42b, and an interface data access object 42c for exposing instances of grid nodes 18, services 28, and clients 24, respectively stored in registry 46. Resource control system 10 may comprise executable instructions stored in a memory and executable on any suitable computing system. In one embodiment, resource control system 10 is executable on one or more grid nodes 18 of computing grid 16.

Event manager 30 receives events generated by enterprise service bus 22 and/or grid nodes 18. In one embodiment, event manager 30 may be configured to respond immediately to events by provisioning or un-provisioning grid nodes 18 or services 28 when the event is received. In another embodiment, event manager 30 may be configured to provision or un-provision grid nodes 18 or services 28 due to a number of received events received over a period of time. For example, a relatively large number of events received during working hours may prompt event manager 30 to schedule an additional grid node 18 to be provisioned during working hours.

Policy manager 32 manages provisioning and un-provisioning of services 28 and grid nodes 18 of computing grid 16. Pool manager 34 manages a pool of existing resources using access strategy handler 44. For example, access strategy handler 44 may incorporate a load balancing algorithm, such as a round-robin or a random access load balancing algorithm. In particular embodiments, access strategy handler 44 may determine whether a particular resource is available to a particular client 24 based upon the QoS guaranteed to the client 24 and the type of resource requested. For example, in a dedicated resources scenario, access strategy handler 44 only allows gold grid nodes 18a to be allocated to gold clients 24a. Similarly, in a shared resources scenario, access strategy handler 44 allows gold/silver grid nodes 18d to be allocated to gold clients 24a and/or silver clients 24b. In particular embodiments, access strategy handler 44 may also be configured with a schedule of when particular resources may be allocated to various clients 24. Access strategy handler 44 may also allocate resources to various clients 24 based upon historical usage trends. For example, in particular shared resources embodiments, a particular grid node 18 may be configured as a gold grid node 18a during certain peak hours, but may be reconfigured as a gold/silver grid node 18d during certain off-peak hours. When provisioning or un-provisioning grid nodes 18 and/or services 28, policy manager 32 may also request information from access strategy handler 44 to determine what resources are to be provisioned or un-provisioned.

Hardware manager 40 manages provisioning and un-provisioning of grid nodes 18 of computing grid 16. In one embodiment, hardware manager 40 is a virtual machine manager that dynamically provisions or un-provisions a selected grid node 18 while other grid nodes 18 continue operating. One example of a suitable virtual machine manager is a VMware Server™, available from VMware, Inc., of Palo Alto, Calif. The VMware Server™ provides dynamic provisioning of one particular grid node 18 on computing grid 16 while other grid nodes 18 remain operational.

Figure 4:
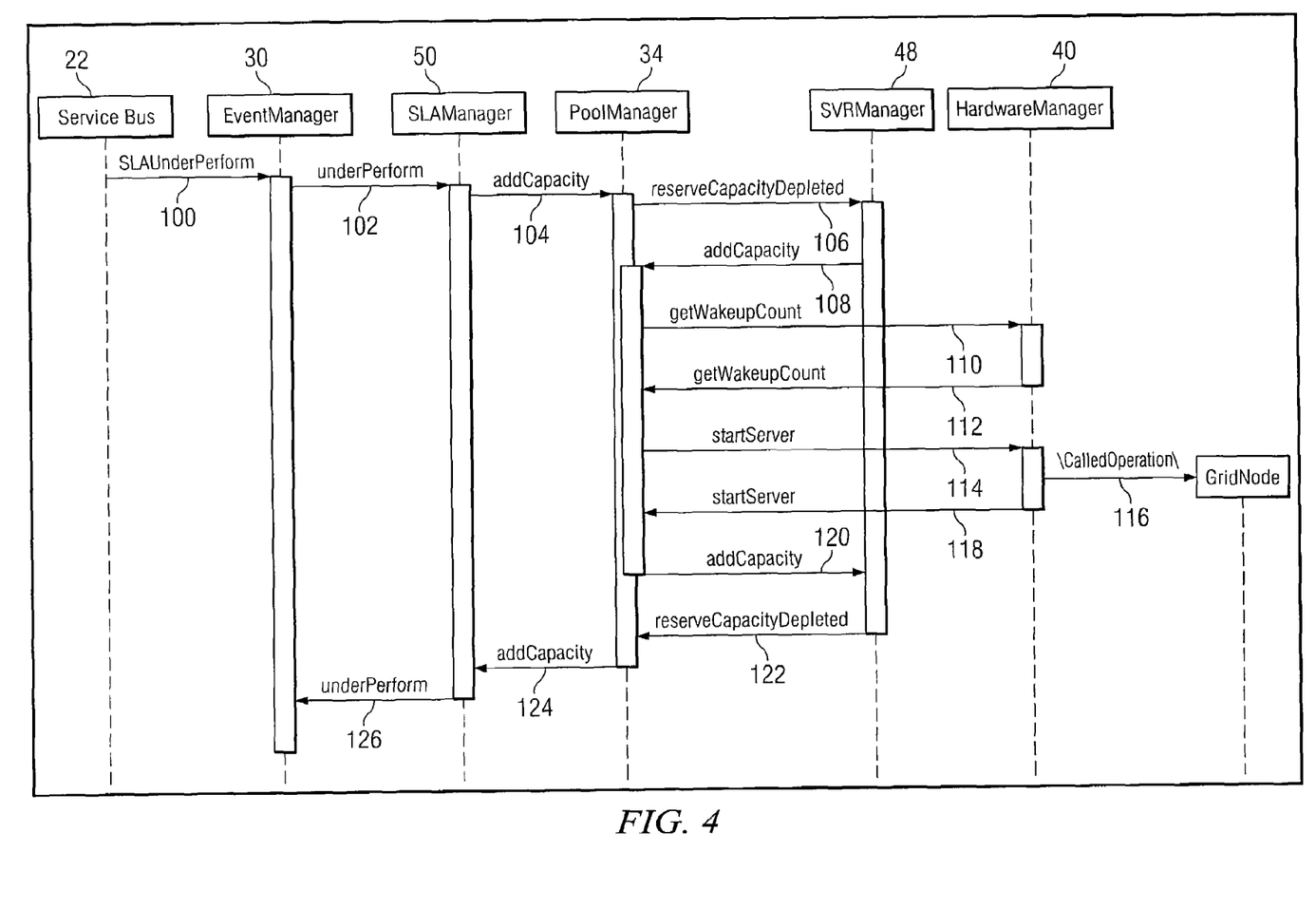
FIG. 4 is a call-flow diagram illustrating one embodiment of a process for provisioning a grid node in response to a determined performance parameter of a service level agreement by the resource control system of FIGS. 1 and 2a-c.

FIG. 4 is a call-flow diagram illustrating one embodiment of a process for provisioning a grid node 18 in response to a determined performance parameter of a service level agreement. In act 100, enterprise service bus 22 transmits a service level agreement (SLA) underperform message to event manager 30. In one embodiment, enterprise service bus 22 transmits service level agreement underperform message as a simple network message protocol (SNMP) trap message.

Event manager 30 may respond immediately to the service level agreement underperform message or over a period of time in which event manager 30 provisions grid node 18 according to a number of received service level agreement underperform messages using a periodic schedule or according to a heuristically assessing resource demand. In either case, event manager 30 manages provisioning of grid node 18 by transmitting an underperform message to service level agreement manager 50 in act 102.

In act 104, service level agreement manager 50 transmits an add capacity message to pool manager 34. Pool manager 34 maintains the operational status and delegates processing load of active services 28 and grid nodes 18 in computing grid 16. From the list of grid nodes 18 not in use, pool manager 34 selects a particular grid node 18 to provision using access strategy handler 44. As discussed above, access strategy handler 44 determines whether the selected grid node 18 can be reconfigured as requested by pool manager. If the proposed provisioning is allowed by access strategy handler 44, in act 106, pool manager 34 determines a particular grid node 18 to be provisioned by transmitting a reserve capacity depleted message to server manager 48. In act 108, receipt of the reserve capacity depleted message causes server manager 48 to respond with an add capacity message accepting the proposed provisioning of grid node 18.

In act 110, pool manager 34 transmits a get wake up count message to hardware manager 40 to request status and provisioning parameters of the particular grid node 18 to be provisioned. In act 112, hardware manager 40 responds to the get wake up count message by sending a wake up count return message to pool manager 34 including the requested information.

In act 114, pool manager 34 processes the received provisioning parameters and internally maintained status of the proposed grid node 18 to be provisioned and transmits a start server message to hardware manager 40. Receipt of the start server message prompts hardware manager 40 to provision the proposed grid node 18 by sending a called operation message to the grid node 18 in act 116 and transmitting a start server return message to pool manager 34 in act 118.

In act 120, once the response to the start server message is received, pool manager 34 sends a add capacity message to server manager 48 to complete any final provisioning actions by server manager 48. When a reserve capacity completed message is received in act 122, pool manager 34 transmits an add capacity return message to service level agreement manager 50, which is forwarded to event manager 30 as an underperform return message in acts 124 and 126. At this point, provisioning of grid node 18 is complete.

The previously described acts of 100 through 126 describe one embodiment of a process for provisioning a grid node 18 in response to an event transmitted by enterprise service bus 22. In other embodiments, a particular grid node 18 may be un-provisioned in response to an event received from enterprise service bus 22.

Figure 5:
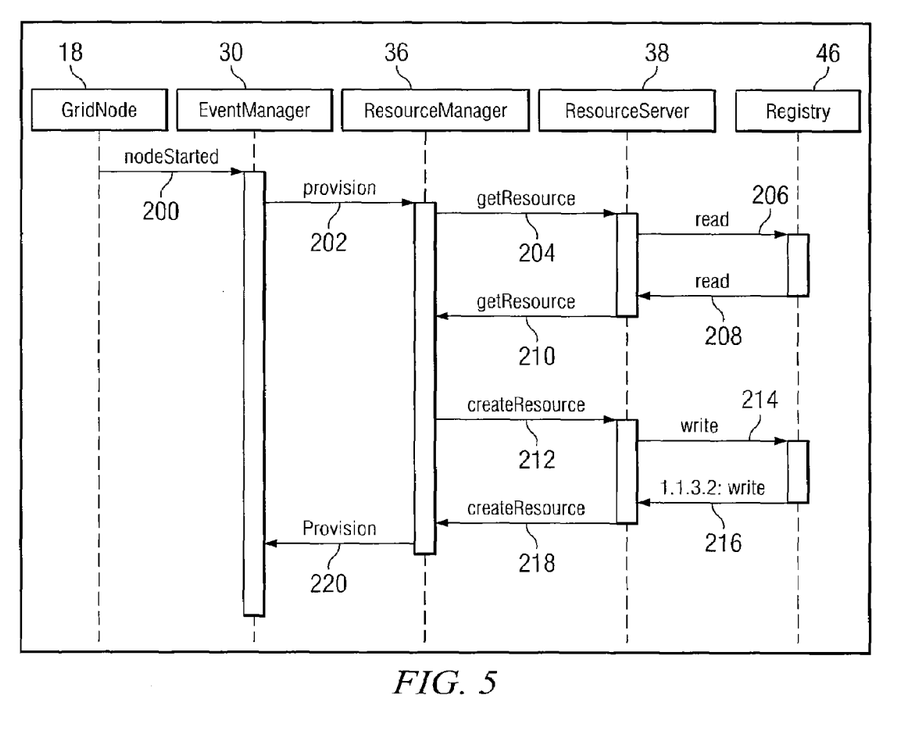
FIG. 5 is a call-flow diagram showing a particular embodiment of a process for provisioning a service on the newly provisioned grid node.

FIG. 5 is a call-flow diagram showing one embodiment of a process for provisioning a service 28 on the newly provisioned grid node 18. In act 200, grid node 18 transmits a node started message to event manager 30. The node started message may be generated by grid node 18 any time after being provisioned and indicates its availability for processing of services 28. In act 202, event manager 30 forwards a provision message to resource manager 36 in response to receipt of node started message from grid node 18.

Resource manager 36 handles provisioning of services 28 executed on grid nodes 18. To generate services 28 on newly provisioned grid node 18, resource manager 36 accesses resource provisioning information from registry 46 by transmitting a get resource message to resource server 38, which is transmitted to registry 46 as a read message in acts 204 and 206. In response, registry 46 transmits a read return message to resource server 38, which is transmitted to resource manager 36 as a response to the get resource message in acts 208 and 210.

Using provisioning information from registry 46, resource manager 36 updates resource provisioning information in registry 46 by transmitting a create resource message to resource server 38, which is transmitted to registry 46 as a write message in acts 212 and 214. Registry 46 updates its resource provisioning information and responds by transmitting a write return message to resource server 38, which is forwarded to resource manager 36 as a create resource return message in acts 216 and 218. Acts 212 through 218 may be repeatedly performed for provisioning additional services 28 on grid node 18. When the one or more services 28 have been provisioned, resource manager 36 transmits a provision return message back to the event manager 30 in act 220. At this point, provisioning of services 28 on the newly provisioned grid node 18 is complete.

Figure 6:
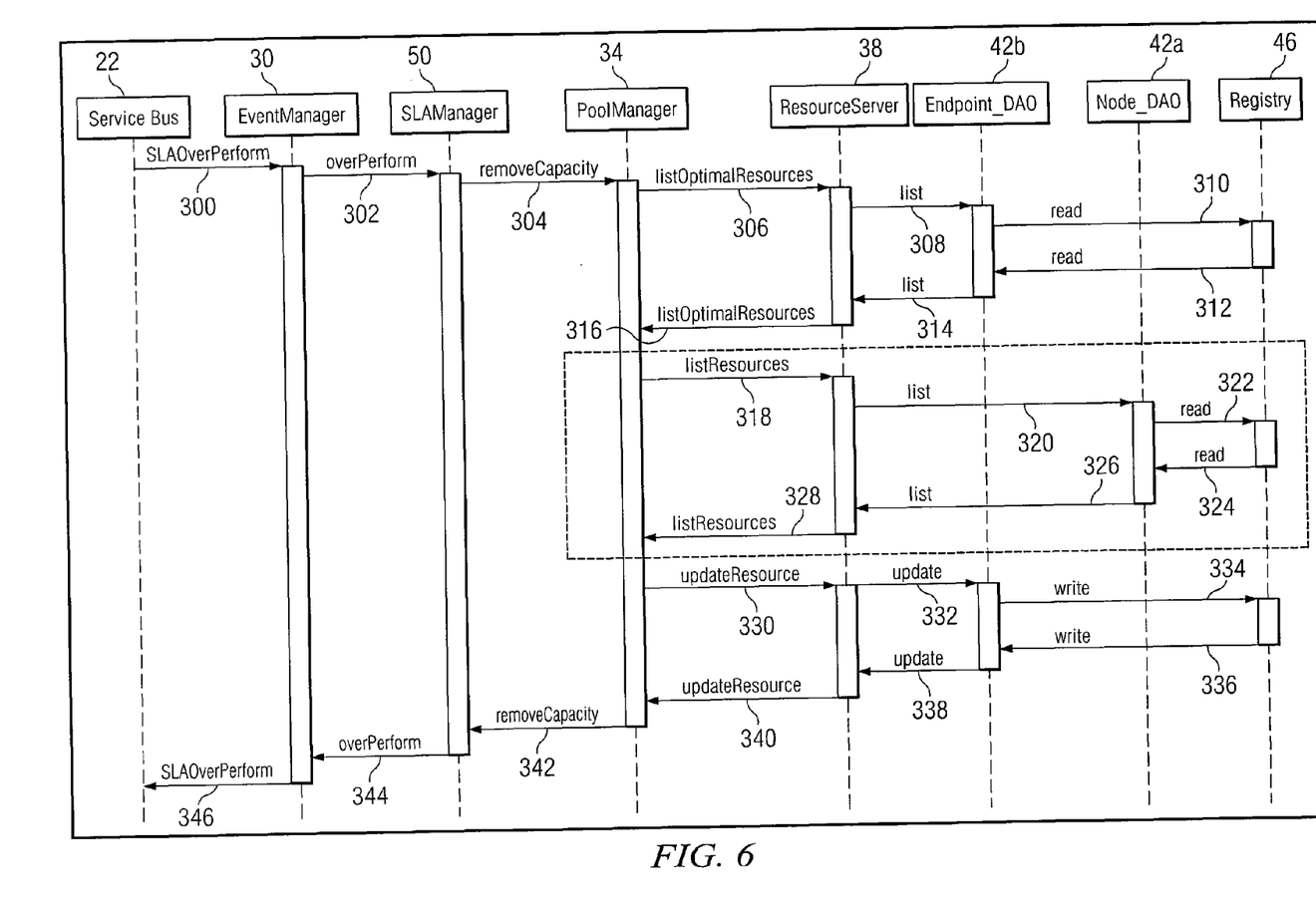
FIG. 6 is a call-flow diagram showing a particular embodiment of a process for un-provisioning a service in response to a determined performance parameter of a service level agreement by the resource control system of FIGS. 1 and 2a-c.

FIG. 6 is a call-flow diagram showing one embodiment of a process for un-provisioning a service 28 in response to a determined performance parameter of a service level agreement. In this particular embodiment, enterprise service bus 22 has determined that one or more performance parameters of a service level agreement has exceeded an upper threshold value. In act 300, enterprise service bus 22 transmits a service level agreement overperform message to event manager 30. Event manager 30 may respond to service level agreement underperform message by un-provisioning a particular service 28, updating a schedule such that the service 28 is provisioned according to the periodic schedule, or heuristically assessing resource demand according to received service level agreement overperform message with other previously received messages. In this particular embodiment, event manager 30 manages un-provisioning of service 28 by transmitting an overperform message to service level agreement manager 50 in act 302.

In act 304, service level agreement manager 50 transmits a remove capacity message to pool manager 34, which handles removal of service 28. To remove service 28, pool manager 34 obtains a list of active services 28 in distributed computing system 12 by transmitting a list optimal resources message to resource server 38. In acts 310, 312, 314, and 316, resource server 38 constructs this list by transmitting a list message to endpoint data access object 42b, which transmits a read message to registry 46 and handling the appropriate response messages from registry 46 and associated endpoint data access object 42b.

Pool manager 34 then determines the status of services 28 that were obtained in acts 306 through 316. In one embodiment, the status of services 28 may be determined by determining the loading and other performance factors of particular grid nodes 18 that execute these services 28. In the particular embodiment, pool manager 34 obtains information for each service 28 by transmitting a list resource message to resource server 38 in act 318. In act 320, resource server 38 transmits a list message to node data access object 42a, which transmits a read message to registry 46 in acts 320 and 322. In acts 324, 326, and 328, registry 46 responds by transmitting grid node information back to pool manager 34 using read return message, list return message, and list resources return message, respectively. Acts 318 through 328 are repeatedly performed for each service 28 obtained in acts 306 through 316 to determine the status of grid nodes 18 on which these services 28 are executed. Given this information, pool manager 34 determines a particular service 28 that may be removed. In one embodiment, services 28 may be selected for removal based upon loading. That is, services 28 that are overloaded may be selected for removal from distributed computing system 12.

In act 330, pool manager 34 transmits an update resource message to resource manager 36 to remove service 28. In acts 332 and 334, resource manager 36 removes service 28 and updates registry 46 by transmitting an update message to endpoint data access object 42b, which transmits a write message to registry 46. In acts 336 and 338, registry 46 responds by transmitting a read return message to node data access object 42a, which transmits a list return message to resource manager 36. Once the service 28 has been removed and registry 46 updated, a update resource response message is transmitted to pool manager 34 in act 340.

In act 342, pool manager 34 transmits a remove capacity return message to service level agreement manager 50 in response to the remove capacity message transmitted in act 304. In act 344, service level agreement manager 50 transmits an overperform return message to event manager 30 in response to the overperform message transmitted in act 302. In act 346, event manager 30 transmits a service level agreement overperform return message in response to the service level agreement overperform message of act 300. At this point, removal of a particular service 28 according to a performance parameter of a service level agreement is complete.

The previously described acts of 300 through 346 describe one embodiment of a process for un-provisioning a service 28 in response to a performance parameter that exceeds an upper threshold value of performance. In other embodiments, a service 28 may be added in response to a performance parameter that goes below a lower threshold value of performance. To add a service 28, pool manager 34 may obtain a list of available services 28 and grid nodes 18 from registry 46. From this list, pool manager 34 may then determine a particular grid node 18 to execute the desired service 28, and launch the service 28 using resource server 38.

A resource control system 10 has been described in which services 28 and/or grid nodes 18 of a computing grid 16 may be provisioned or un-provisioned according to monitored performance parameters of a service level agreement. In the embodiment described above, provisioning and un-provisioning of services 28 and/or grid nodes 18 may be handled, in part, by an event manager 30. The event manager 30 provisions and un-provisions services 28 and/or grid nodes 18 immediately in response to an generated performance parameter triggered event, to a periodic schedule, or to a heuristically determined assessed resource demand.

Accordingly, in a particular embodiment of the present invention, a distributed computing system comprises a computing grid including a plurality of grid nodes, a web server configured in a service-oriented architecture, and a resource control system communicatively coupled to the web server. The web server is operable to provide one or more business applications to a plurality of clients by executing one or more services on the plurality of grid nodes, wherein the plurality of clients comprises a plurality of client subsets, each client subset requiring a respective quality of service, and each of the grid nodes in the computing grid is assigned a particular client subset for which to execute services. The resource control system is operable to receive one or more performance parameters of the business applications executed on the plurality of grid nodes, provision one or more of the grid nodes in response to the performance parameters falling below a predetermined minimum level, and un-provision one or more of the grid nodes in response to the performance parameters exceeding a predetermined maximum level.

In another embodiment of the present invention, a distributed computing system comprises a web server configured in a service-oriented architecture and a resource control system communicatively coupled to the web server. The web server is operable to provide one or more business applications to a plurality of clients by executing one or more services on a plurality of computing grid nodes, wherein the plurality of clients comprise a plurality of client subsets, each client subset requiring a respective quality of service, and each of the grid nodes in the computing grid is assigned a particular client subset for which to execute services. The resource control system is operable to receive one or more performance parameters of the business applications executed on the plurality of grid nodes and provision or un-provision one or more of the grid nodes in response to the performance parameters exceeding or falling below predetermined limits.

In yet another embodiment of the present invention, a method for allocating resources in a distributed computing system comprises determining one or more performance parameters of one or more business applications provided by a web server configured in a service-oriented architecture, the web server operable to provide the one or more business applications to a plurality of clients by executing one or more services on a plurality of grid nodes configured in a computing grid; determining whether the one or more performance parameters fall below a predetermined minimum level or exceed a predetermined maximum level; and provisioning one or more of the grid nodes if the performance parameters falls below the predetermined minimum level; or un-provisioning one or more of the grid nodes if the performance parameters exceeds the predetermined maximum level; wherein the plurality of clients comprise a plurality of client subsets, each client subset requiring a respective quality of service; wherein each of the grid nodes in the computing grid is assigned a particular client subset for which to execute services; and wherein provisioning or un-provisioning the one or more grid nodes depends, at least in part, on the particular client subset assigned to the one or more grid nodes.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A distributed computing system, comprising:
   a computing grid including a plurality of grid nodes, each grid node being assigned to service at least one of a plurality of tiers of clients, each tier associated with a corresponding quality of service level, a first set of grid nodes assigned to service only a first tier of clients, a second set of the grid nodes assigned to service a second tier of clients, and a third set of grid nodes assigned to service a combination of the first, second, and third tiers of clients;
   a web server configured in a service-oriented architecture and operable to provide one or more business applications to a plurality of clients by executing one or more services on the plurality of grid nodes, each of the clients being associated with a corresponding tier of the plurality of tiers; and
   a resource control system communicatively coupled to the web server and operable to:
      determine a least busy set of grid nodes selected from the first set of grid nodes and the third set of grid nodes based on a received request from the first tier of clients;
      allocate the first tier of clients to the first set of grid nodes based on determining that the first set of grid nodes is the least busy set of grid nodes selected from the first set of grid nodes and the third set of grid nodes;
      receive one or more performance parameters of the business applications executed on the first set of the plurality of grid nodes;
      determine the first tier of clients being serviced by the first set of grid nodes;
      provision one or more additional services to execute on the first set of grid nodes in response to the performance parameters falling below a predetermined minimum level;
      un-provision one or more services executed on the first set of grid nodes in response to the performance parameters exceeding a predetermined maximum level;
      provision one or more additional grid nodes from the plurality of grid nodes in response to the performance parameters falling below the predetermined minimum level; and
      un-provision one or more of the first subset of grid nodes in response to the performance parameters exceeding the predetermined maximum level.

2. The system of claim 1, wherein the resource control system comprises an access strategy handler operable to determine whether a particular grid node may be provisioned or un-provisioned based, at least in part, upon the at least one of the plurality of tiers of clients assigned to the particular grid node.

3. The system of claim 2, wherein the access strategy handler is operable to reassign one or more grid nodes from executing services for the first tier of clients to executing services for the second tier of clients.

4. The system of claim 3, wherein the access strategy handler is operable to reassign the one or more grid nodes based, at least in part, upon a date and time of a request and an availability schedule of the grid nodes.

5. The system of claim 1, wherein the one or more performance parameters comprise a metric of a service level agreement associated with the one or more business applications.

6. The system of claim 1, wherein at least one of the performance parameters is selected from the group consisting of a response latency time, an average data throughput, a minimum data throughput, and an idle server time.

7. The system of claim 1, wherein the second set of grid nodes is assigned to service a combination of the first tier of clients and the second tier of clients, and the resource control system is operable to determine the least busy set of grid nodes selected from the second set of grid nodes in addition to the first set of grid nodes and the third set of grid nodes based on the received request from the first tier of clients.

8. A distributed computing system, comprising:
   one or more memory units; and
   one or more computer systems operable to implement:
      a web server configured in a service-oriented architecture and operable to provide one or more business applications to a plurality of clients by executing one or more services on a plurality of computing grid nodes, each grid node being assigned to service at least one of a plurality of tiers of clients, each tier associated with a corresponding quality of service level, each of the clients being associated with a corresponding tier of the plurality of tiers, a first set of grid nodes assigned to service only a first tier of clients, a second set of the grid nodes assigned to service a second tier of clients, and a third set of grid nodes assigned to service a combination of the first second and third tiers of clients; and a resource control system communicatively coupled to the web server and operable to:

determine a least busy set of grid nodes selected from the first set of grid nodes and the third set of grid nodes based on a received request from the first tier of clients;

allocate the first tier of clients to the first set of grid nodes based on determining that the first set of grid nodes is the least busy set of grid nodes selected from the first set of grid nodes and the third set of grid nodes;

receive one or more performance parameters of the business applications executed on the first set of the plurality of grid nodes;

provision or un-provision one or more of the services in response to the performance parameters exceeding or falling below predetermined limits; and provision or un-provision one or more of the grid nodes in response to the performance parameters exceeding or falling below predetermined limits.

9. The system of claim 8, wherein the resource control system comprises an access strategy handler operable to determine whether a particular grid node may be provisioned or un-provisioned based, at least in part, upon the at least one of the plurality of tiers of clients assigned to the particular grid node.

10. The system of claim 9, wherein the access strategy handler is operable to reassign one or more grid nodes from executing services for the first tier of clients to executing services for the second tier of clients.

11. The system of claim 10, wherein the access strategy handler is operable to reassign the one or more grid nodes based, at least in part, upon a date and time of a request and an availability schedule of the grid nodes.

12. The system of claim 8, wherein the one or more performance parameters comprise a metric of a service level agreement associated with the one or more business applications.

13. The system of claim 8, wherein at least one of the performance parameters is selected from the group consisting of a response latency time, an average data throughput, a minimum data throughput, and an idle server time.

14. The system of claim 8, wherein the second set of grid nodes is assigned to service a combination of the first tier of clients and the second tier of clients, and the resource control system is operable to determine the least busy set of grid nodes selected from the second set of grid nodes in addition to the first set of grid nodes and the third set of grid nodes based on the received request from the first tier of clients.

15. A method for allocating resources in a distributed computing system, comprising:

determining one or more performance parameters of one or more business applications provided by a web server configured in a service-oriented architecture, the web server operable to provide the one or more business applications to a plurality of clients by executing one or more services on a plurality of grid nodes configured in a computing grid, each grid node being assigned to service at least one of a plurality of tiers of clients, each tier associated with a corresponding quality of service level, each of the clients being associated with a corresponding tier of the plurality of tiers, a first set of grid nodes assigned to service only a first tier of clients, a second set of the grid nodes assigned to service a second tier of clients, and a third set of grid nodes assigned to service a combination of the first, second, and third tiers of clients;

determining a least busy set of grid nodes selected from the first set of grid nodes and the third set of grid nodes based on a received request from the first tier of clients;

allocating the first tier of clients to the least busy set of grid nodes selected from the first set of grid nodes and the third set of grid nodes;

determining whether the one or more performance parameters fall below a predetermined minimum level or exceed a predetermined maximum level;

provision one or more additional services to execute on the plurality of grid nodes if the performance parameters fall below the predetermined minimum level;

un-provision one or more services executed on the plurality of grid nodes if the performance parameters exceed the predetermined maximum level;

provisioning one or more of the grid nodes if the performance parameters falls below the predetermined minimum level; and un-provisioning one or more of the grid nodes if the performance parameters exceeds the predetermined maximum level;

wherein provisioning and un-provisioning one or more grid nodes depends, at least in part, on the at least one of the plurality of tiers of clients assigned to the one or more grid nodes.

16. The method of claim 15, wherein the one or more performance parameters comprise a metric of a service level agreement associated with the one or more business applications.

17. The method of claim 15, wherein at least one of the performance parameters is selected from the group consisting of a response latency time, an average data throughput, a minimum data throughput, and an idle server time.

18. The method of claim 15, wherein provisioning and un-provisioning one or more of the grid nodes depends, at least in part, on a date and time of a request and an availability schedule of the one or more grid nodes.

19. The method of claim 15, wherein provisioning one or more of the grid nodes comprises:

determining a particular tier of clients requiring additional grid nodes;

selecting one or more grid nodes to provision for the particular tier of clients requiring additional grid nodes; and determining whether the selected grid nodes are assigned to execute services for the particular tier of clients; and provisioning the selected grid nodes to execute services for the particular tier of clients if the selected grid nodes are assigned to execute services for the particular tier of clients.

20. The method of claim 15, wherein the second set of grid nodes is assigned to service a combination of the first tier of clients and the second tier of clients, and determining the least busy set of grid nodes further comprises selecting from the second set of grid nodes in addition to the first set of grid nodes and the third set of grid nodes based on the received request from the first tier of clients.

* * * * *